United States Patent [19]
Liebert

[11] 3,952,445
[45] Apr. 27, 1976

[54] SIMULATED EYE CONSTRUCTION

[76] Inventor: Ronald K. Liebert, 7514 W. 93rd St., Zionsville, Ind. 46077

[22] Filed: Aug. 25, 1975

[21] Appl. No.: 607,140

[52] U.S. Cl. ................................ 43/42.34; 46/165
[51] Int. Cl.² ........................................ A01K 85/00
[58] Field of Search............. 43/42.34, 42.33, 42.37; 46/165, 170

[56] References Cited
UNITED STATES PATENTS

| | | | |
|---|---|---|---|
| 1,067,178 | 7/1913 | Lambert | 43/42.34 |
| 1,967,692 | 7/1934 | Walker | 46/165 |
| 2,791,869 | 5/1957 | Wagner | 46/165 |
| 3,881,272 | 5/1975 | Parker | 43/42.34 |

Primary Examiner—Warner H. Camp
Attorney, Agent, or Firm—Woodard, Weikart Emhardt & Naughton

[57] ABSTRACT

A simulated eye construction for use on fishing lures or the like has a flat wafer imbedded near the apex of a cup-shaped transparent body. The face of the wafer opposite the flat surface of the body has a distinctive color and the inner face of the flat body surface has a mirror finish so that the colored face of the wafer is reflected through the body to provide a colored penumbra for the face of the wafer visible through, and facing the apex area of the body.

8 Claims, 7 Drawing Figures

SIMULATED EYE CONSTRUCTION

BACKGROUND OF THE INVENTION

Study of fish behavior, particularly investigation of the separation of species and the occupation of closely adjacent ecological niches or grooves indicates various biological signals produce specific behavioral responses. Automatic response to visual signals is particularly strong in the teleostean group of fishes, which includes the game fish caught with various types of fishing lures. A life-like eye structure on a fishing lure adds to the authenticity of the artificially originated visual signal which the lures provide to game fish and, hence more dependably produces the strike response.

The concept of the present invention provides a particularly life-like, three dimensional eye structure for use on various types of fishing lures or on fishing hooks. The simulated eye is relatively simple in construction and thus easily and economically manufactured.

DESCRIPTION OF THE PREFERRED EMBODIMENTS

Figure 1:
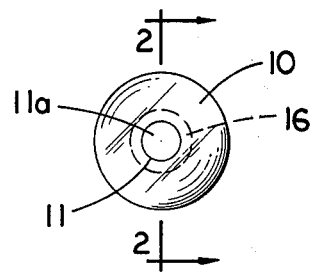
FIG. 1 is a front plan view of a simulated eye structure embodying the present invention.
Figure 2:
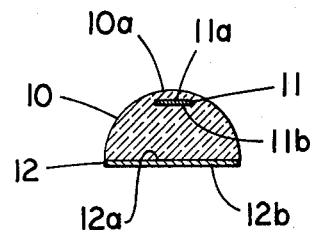
FIG. 2 is a side sectional view taken generally along the line 2—2 of FIG. 1.

Referring initially to FIGS. 1 and 2, the simulated eye structure of the present invention includes a generally cup-shaped, substantially transparent body 10 presenting a curved or convex outer front surface and having a generally flat, planar rear surface. A thin wafer 11 which has a disc-shaped configuration and which may be formed of paper or other suitable material is imbedded in the body 10 adjacent the apex area 10a (FIG. 2). The wafer 11 has surfaces 11a and 11b which are provided with contrasting colors. The upper surface 11a of the wafer may, for example, be colored black and the under surface 11b of the wafer may be blue in color. The body 10 is preferably formed of a clear or substantially transparent plastic such as clear epoxy resin. The planar rear surface of the body 10 is provided with a reflecting, mirror-like surface and, as shown in FIG. 2, the means providing the reflecting surface may take the form of a thin disc 12 of suitable foil or plated plastic material whose upper face 12a has the reflecting, mirror-like surface and whose rear face 12b may be any suitable surface or texture.

Referring again to FIG. 1, the life-like appearance of the simulated eye construction is a result of the surface 11a of the wafer 11 being clearly visible through the thin layer of resin which covers it while the underface of the wafer 11, indicated at 11b in FIG. 2, which has a contrasting color to that of face 11a is reflected from the mirror-like surface 12a, the reflected color being visible from the front of the eye structure as a bordering or encircling penumbra 16 for the wafer 11. Where the underface 11b of the wafer 11 is blue in color and the upper face 11a of the wafer is black, the eye structure shown in FIG. 1 will have a black pupil 11a with a surrounding penumbra 16 which will be blue. The penumbra 16 will appear larger in circumference than the disc 11 and this occurs, as presently understood, because of the divergence of the light moving from mirror surface 12a and across the light-refracting, convex-surface of body 10. An added, apparent-depth effect is given the eye because the convex, light-refracting surface of body 10 produces a virtual image of the surface 11b which is displaced in back of or rearwardly of the mirror surface 12a which is, in effect, the light source.

Figure 3:
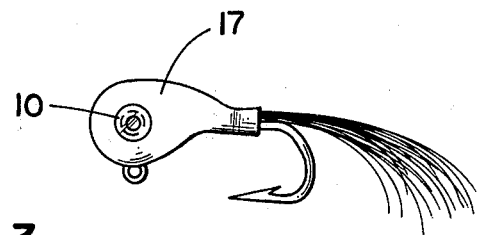
FIG. 3 illustrates the eye structure of FIG. 1 incorporated into a fishing lure.
Figure 4:
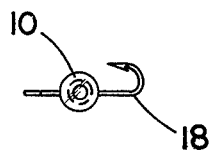
FIG. 4 is a side view of a fishing hook incorporating the eye structure of the present invention.
Figure 5:
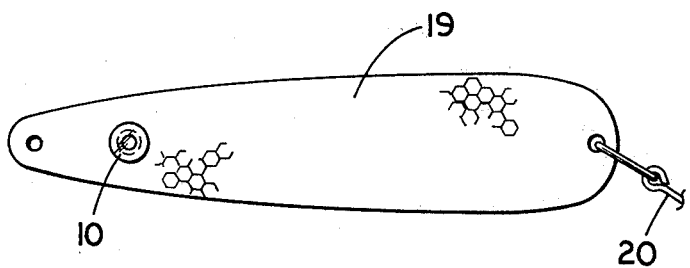
FIG. 5 is a front view of a spoon-type fishing lure incorporating the eye structure of the present invention.

The simulated eye structure of FIGS. 1 and 2 is shown applied by any suitable adhesive to the typical jig-type lure 17 shown in FIG. 3. In FIG. 4, the eye structure is shown attached to a conventional fishing hook 18. In FIG. 5 the eye structure is shown attached at its flat base to a conventional spoon-type lure 19 which may have a conventional multi-hook attachment 20.

Figure 6:
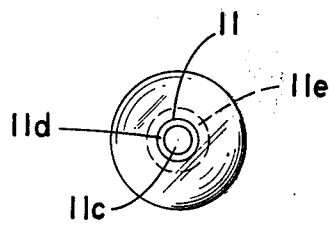
FIG. 6 is a front plan view, similar to FIG. 1, but showing a modified form of the simulated eye structure.

In FIG. 6 there is disclosed a modified form of the eye structure which displays a three-colored structure. This variation is obtained by providing the upper face of the disc 11 with a central, circular area 11c of one color, black for example, and a bordering band 11d of a contrasting color such as white. With the underface of the disc 11 colored a desired third contrasting color such as blue, the reflected penumbral area 11e will complete the three color display.

The eye structure might be fabricated in various ways, however, one constructional sequence for the eye may proceed by initially cutting a round disc of thin foil or plated material which might be either metal or plastic, the primary requirement being that it have a mirror-like, reflecting surface. This element forms the member 12 and both of its surfaces 12a and 12b may be mirror-like (this is preferable where the eye structure is to be utilized as shown in FIG. 4), however, at least the surface 12a must be mirror-like. Transparent epoxy resin, or similar substance, which is initially a thick semi-liquid is applied to the upper face 12a of the member 12 and this material is added in sufficient volume so that the curved or convex characteristic shape of the body 10 is formed. At the apex of the body a thin plastic or paper disc 11 is added and subsequently a slight additional amount of the transparent plastic substance is added at the apex area of the body to thus seal the wafer 11 into the body 10. The structure is then allowed to dry and harden and, subsequent to this, the eye may be secured to any suitable backing such as a lure by an adhesive applied to the base surface 12 of the eye. Where the eye structure is to be utilized on a fishing hook as shown in FIG. 4, before the semi-transparent plastic material is applied to the base 12, the fish hook is secured to the surface 12a by means of any suitable adhesive (such as an epoxy cement). The hook, preferably, is arranged so as to extend radially across the member 12. After the hook has been attached to the member 12, the transparent resinous material may be added to form the convex body 10 carrying the wafer 11 at its apex area as described above.

Figure 7:
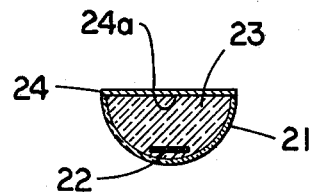
FIG. 7 is a side sectional view of a modified form of construction of the simulated eye structure of the present invention.

Another manner of constructing the eye structure of the present invention is illustrated at FIG. 7. Here a clear plastic cup having a thin wall is indicated at 21. A wafer 22 having contrastingly colored upper and lower faces, and comparable to the wafer 11 of FIG. 2, is placed in the cup and the cup shaped member is filled with a semi transparent resin 23. Overlying the resin, and attached by any suitable means to the cup 21, is a disc 24 having an inner mirror-like surface 24a, the member 24 being comparable to the member 12 of FIG. 2.

The enhanced three-dimensional, or depth, effect given to the eye structure by the arrangement of its components provides a particularly life-like appearance to the eye structure and thus makes it particularly suitable for use on fishing lures.

While the invention has been disclosed and described in some detail in the drawings and foregoing description, they are to be considered as illustrative and not restrictive in character, as other modifications within the scope of the invention may readily suggest themselves to persons skilled in the art.

I claim:

1. A simulated eye construction comprising a generally cup-shaped substantially transparent body presenting a curved outer front surface and a generally flat planar rear surface, a thin wafer having its opposite faces of contrasting colors imbedded in said body at the apex area of the body and oriented so that one of its colored faces is spaced from and faces said rear surface of the body and its other colored face is directly visible through the apex area of the body, and means overlying said rear surface of the body providing a reflecting mirror-like surface adjacent thereto whereby said one colored face of the wafer is reflected through said body to provide a contrastingly colored penumbra for the face of said wafer visible through the body.

2. A simulated eye construction as claimed in Claim 1 in which said body is formed of a substantially transparent resinous material.

3. A simulated eye construction as claimed in Claim 1 in which said body is formed of epoxy resin.

4. A simulated eye construction as claimed in Claim 1 in which said planar rear surface of the body is secured to the surface of a fishing lure.

5. A simulated eye construction as claimed in Claim 1 in which said overlying means comprises a flat disc having a reflecting mirror-like surface on both of its side faces.

6. A simulated eye construction as claimed in Claim 1 in which said body is adapted to accommodate the shank of a fish hook extending radially therethrough between said wafer and said flat rear surface of the body.

7. A simulated eye construction as claimed in Claim 1 in which the face of said wafer directly visible through the apex area of the body is provided with a colored band concentric with the wafer and contrasting in color with the remainder of the wafer face.

8. A simulated eye construction as claimed in Claim 1 in which at least one of the faces of said wafer is provided with a colored band concentric with the wafer and contrasting in color with the remainder of the wafer face.

* * * * *